United States Patent [19]

Marchal et al.

[11] Patent Number: 5,447,339
[45] Date of Patent: Sep. 5, 1995

[54] PIPE FOR CARRYING FLUIDS, PARTICULARLY HYDROCARBONS

[75] Inventors: Philippe Marchal, 4, rue Dufy, 78370 - Plaisir; Claude Jullien, deceased, late of Puteaux, both of France, by Christine Jullien, legal representative

[73] Assignee: Philippe Marchal, Vaucresson, France

[21] Appl. No.: 107,802

[22] PCT Filed: Feb. 26, 1992

[86] PCT No.: PCT/FR92/00175

§ 371 Date: Feb. 22, 1994

§ 102(e) Date: Feb. 22, 1994

[87] PCT Pub. No.: WO92/14962

PCT Pub. Date: Sep. 3, 1992

[30] Foreign Application Priority Data

Feb. 26, 1991 [FR] France ................. 91 02266

[51] Int. Cl.6 ............................................ F16L 11/12
[52] U.S. Cl. ........................................ 285/47; 285/114; 285/138; 285/286; 285/355; 285/369; 285/906
[58] Field of Search ................. 285/47, 114, 138, 187, 285/286, 355, 369, 906

[56] References Cited

U.S. PATENT DOCUMENTS

| | | | |
|---|---|---|---|
| 4,524,996 | 6/1985 | Hunt | 285/286 X |
| 4,635,967 | 1/1987 | Stephenson | 285/47 X |
| 4,660,861 | 4/1987 | Argy et al. | 285/47 X |
| 4,793,383 | 12/1988 | Gyory et al. | 285/47 X |

FOREIGN PATENT DOCUMENTS

| | | |
|---|---|---|
| 3322405 | 1/1985 | Germany . |
| 3534994 | 4/1986 | Germany . |
| 1348318 | 3/1974 | United Kingdom . |
| 2191842 | 12/1987 | United Kingdom . |

*Primary Examiner*—Dave W. Arola
*Attorney, Agent, or Firm*—Hoffman, Wasson & Gitler

[57] ABSTRACT

The invention describes a pipe for carrying fluid, including thermally insulated steel pipe sections of a type including an outer tubular shell, an inner cylindrical shell of smaller diameter, in the inner shell being sealingly welded to the outer shell at each of the ends of the pipe sections. It is characterized in that at each joint, the ends of the two inner shells are welded to each other, and a sleeve links to the ends of the outer shells so that when traction, compression or bending forces are exerted on the pipe, the said sleeve transmits these forces to the outer shells.

20 Claims, 4 Drawing Sheets

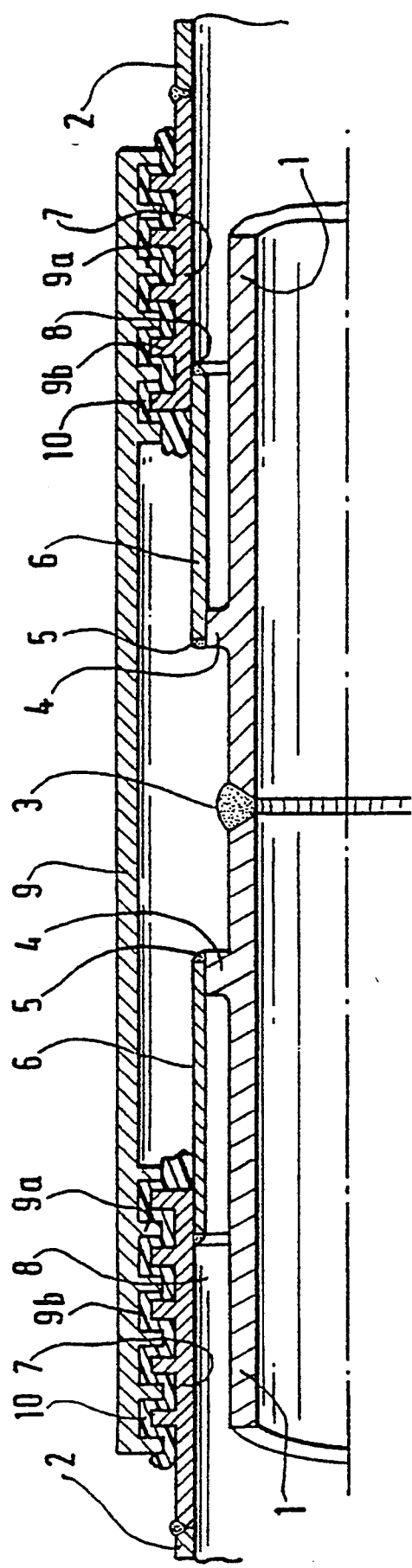
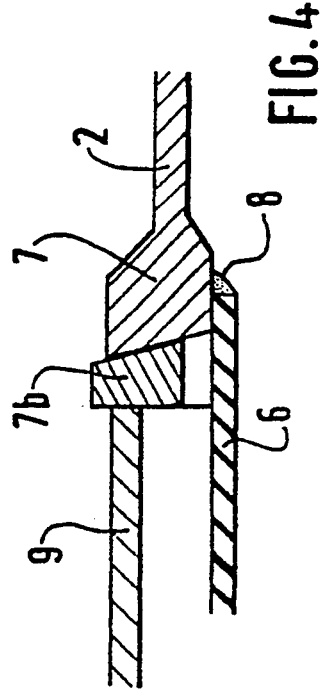
FIG.1
FIG.4

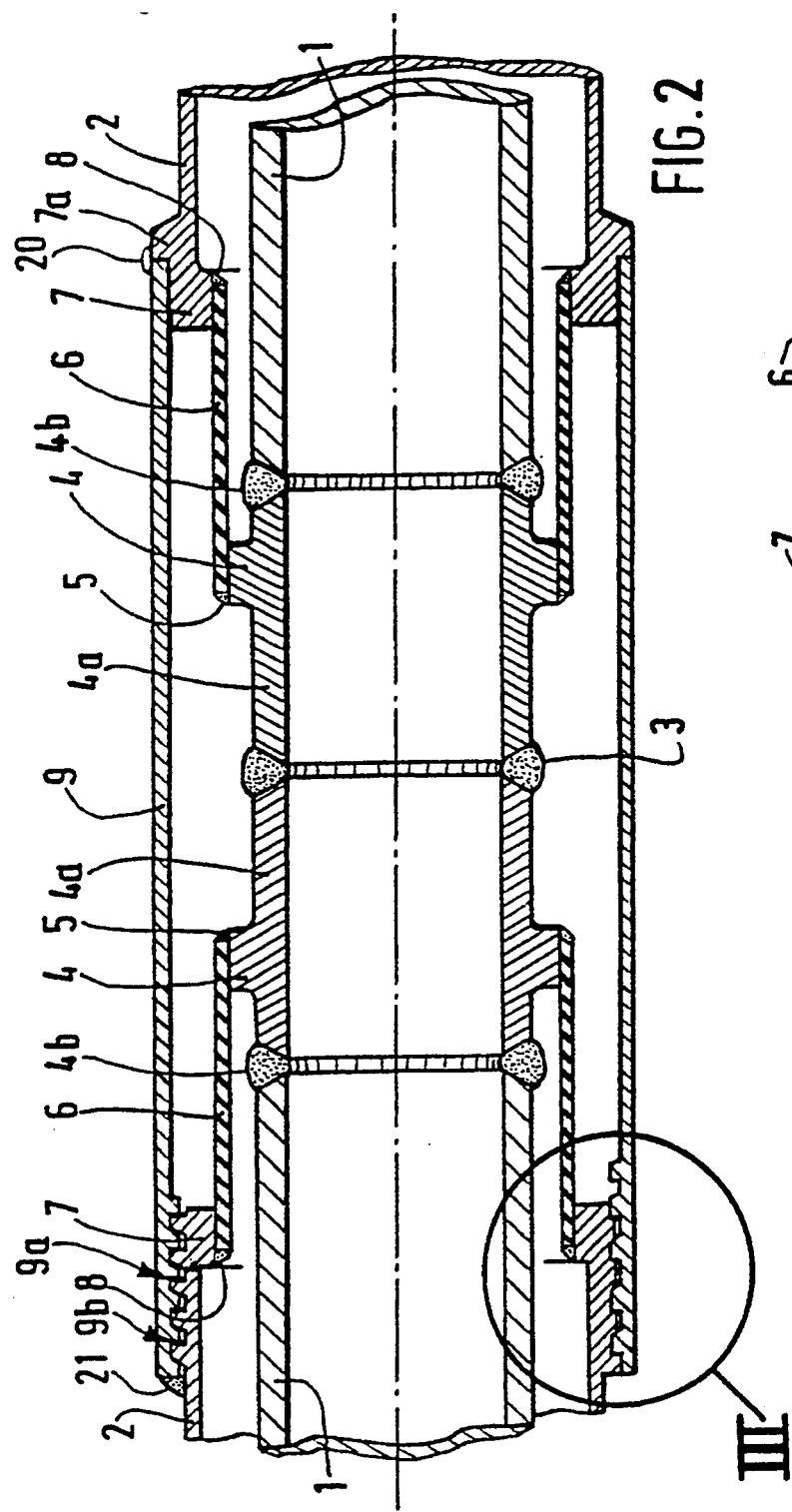
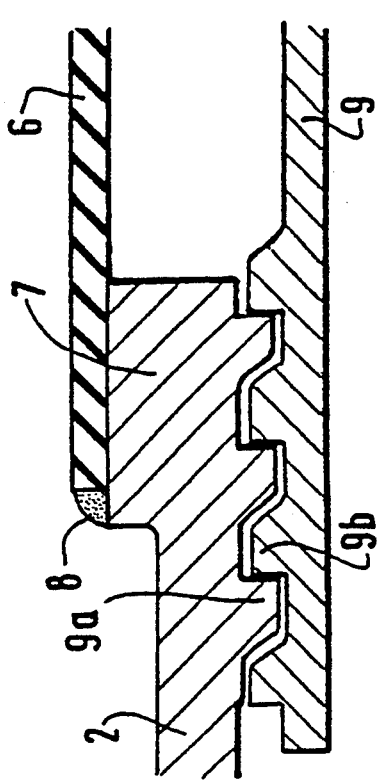
FIG.2
FIG.3

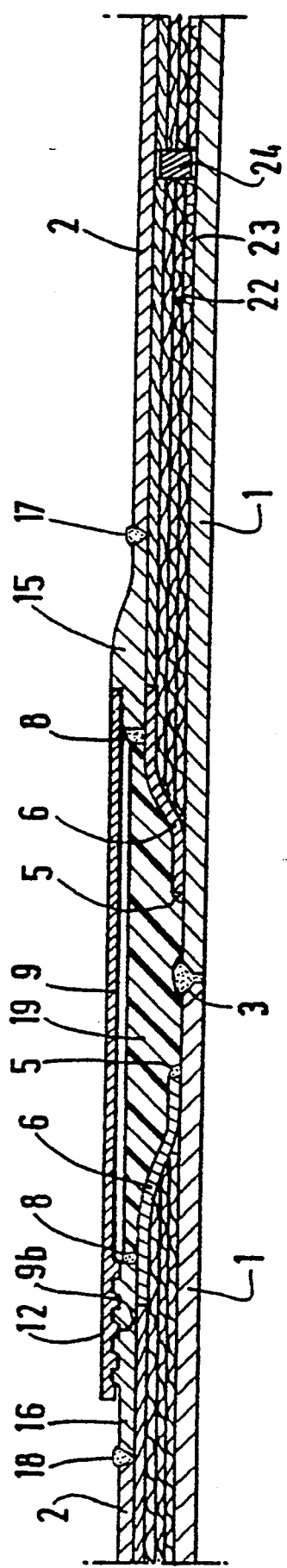
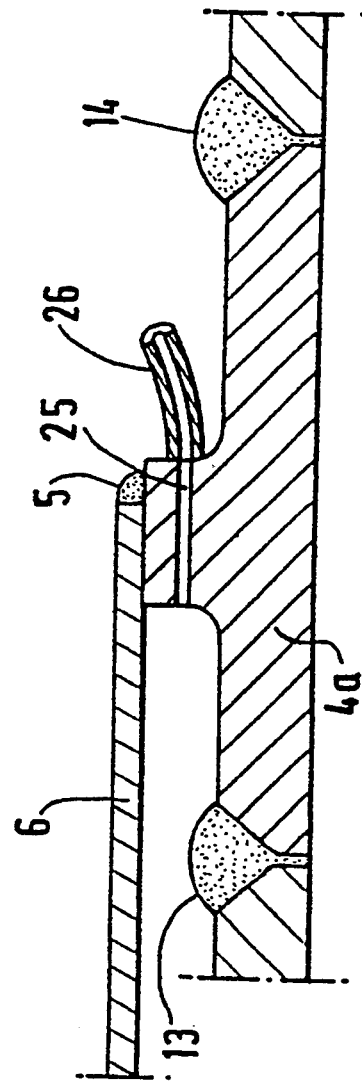
FIG. 5
FIG. 6

PIPE FOR CARRYING FLUIDS, PARTICULARLY HYDROCARBONS

The present invention relates to a pipe for carrying fluids, particularly hydrocarbons, made by assembling heat-insulated metal tubes.

It is known that in a number of cases, crude oil is extracted from the ground at a temperature which is several tens of degrees greater than the ambient temperature and that, when this crude oil contains paraffinic products, its cooling to ambient temperature (or even to temperatures greater than the ambient temperature) causes for example precipitation of these products which progressively leads to blockage of the pipe.

It has already been attempted to overcome these difficulties by surrounding the pipes with thick insulators based on expanded materials which must themselves be protected by a layer of rigid materials, so as to withstand the various stresses to which the pipe is subjected both when it is fitted and when it is used.

These insulators have the drawback of being bulky, and of considerably increasing the external dimensions of the pipe. They also greatly increase its buoyancy, which often requires its ballasting to be increased.

In the latter case, it is then necessary to weight the pipe by encasing it in concrete, which is almost always difficult to make adhere to the outer wall of the insulator.

These known pipes also have the drawback of corroding easily when the outer insulator becomes degraded or because of the thermal expansions which are different between the steel tube and the insulator.

It also been envisaged to produce insulating tube sections consisting of an outer tubular element and an inner tubular element which are welded at their ends and which contain between them an insulating element in order to constitute pipes.

The use of such tube sections has proved unsatisfactory, in particular because of the difficulties which are encountered in joining the tubular elements together in order to constitute the pipes.

The object of the present invention is to obtain, in a simple and economical manner, a pipe produced from thermally insulated steel tube sections, but which include no outer insulator and which can be handled, fitted and used for producing submerged or overland pipes, exactly in the same way as conventional steel tube sections which include no insulator.

The subject of the present invention is a pipe for carrying fluids, particularly hydrocarbons, consisting of thermally insulated steel tube sections, of the type comprising an outer tubular steel shell, an inner cylindrical steel shell of smaller diameter, the inner shell being welded in a leaktight manner to the outer shell at each of the ends of the tube sections, while leaving between the two shells a closed annular volume, preferably containing a heat insulating material, which pipe is characterized in that, at each joint between two tube sections, the ends of the inner shells of the two pipe sections are welded to one another, while a sleeve joins the ends of the outer shells, such that when traction, compression or bending forces are exerted on the pipe, the said sleeve communicates these forces to the outer shells while imparting to the pipe a mechanical strength at each joint which is at least equal to that of the tube sections.

According to a first embodiment of the invention, the sleeve is screwed onto each outer shell by a cylindrical thread, preferably with straight turn fronts, which includes between the male and female turns a clearance which is sufficient to compensate for alignment and positioning defects in the two sections when they are joined by welding their inner shells, and the space contained between the male turns and the female turns is lined with a substance, for example a polymerizable substance, which transmits the compression or traction forces which are to be exerted between the sleeve and the outer shells.

In order to do this, the total surface areas of the turn flanks must be chosen to be sufficiently large to allow for the crushing strength of the substance which is introduced between the male turns of the outer shells and the female turns of the sleeve.

This embodiment makes it possible, in a simple and economical manner, to connect two pipeline sections by a single weld which joins the inner shells in a leaktight manner, the outer shells being joined to each other by the substance, which can most often be applied cold, which is placed in the threads.

Moreover, the clearance between the turns of the sleeve and of the outer shells is sufficient to compensate for any positioning defects which may result from the joining of the two sections by welding their inner shells, either in the case of alignment defects or parallax of the axes of the two sections or alternatively shifts in pitch between the turns of the two outer shells.

The substance introduced between the turns may for example be a resin such as an epoxy resin or an araldite which polymerizes not with contraction, but preferably with expansion.

It is also possible to use polymerizable elastomers and products such as coal pitches which are applied hot and which are allowed to cool.

In a second variant of this first embodiment, the forces are transmitted between the sleeve and the outer shells of the two sections by virtue of the fact that, when the pipeline bench, the male turns of the outer shells of the two sections bear on the female turns of the sleeve. In order to allow bending of the inner shell at the joint which is sufficient to ensure compensation for the clearance existing between the turns of the sleeve and those of the outer shells, the collars joining the inner and outer shells to the end of each section are welded onto the inner shells at a sufficient distance from the ends of the inner shells.

In this variant, a free length of inner shell is left at a joint which may for example be of the order of one meter.

This characteristic is also advantageous in the first variant of this embodiment because it makes it possible to ensure mechanical continuity of the pipeline, even in the event that the substance injected only partially occupies the space between the turns of the sleeve and of the outer shells, and therefore has only an insufficient mechanical strength.

In a second embodiment of the invention, the sleeve is fitted at one of its ends with an internal thread which is screwed onto a corresponding external thread made on the end of the outer shell of a first tube section, such that the other end of the said sleeve is applied against a stop integral with the outer tubular shell of a second neighbouring tube section with a sufficient force for the pipe to have, at the joints between the various sections, a mechanical strength at least equal to that of the other parts of the pipe.

According to a preferred variant, the thread by which the sleeve is screwed onto the outer tubular shell of the first tube section is a cylindrical thread with bearing turn fronts substantially perpendicular to the axis of the pipe, so as to allow compensation for the slight parallaxes which may be produced when the inner tubular shells are joined by welding and which lead to the axes of the various sections of the pipe being slightly offset, albeit remaining parallel to each other.

According to this embodiment, the sleeve is screwed so as to impart to it, during mounting, an axial compression of a value greater than the maximum extension that some of its generatrices may undergo when the pipe is fitted or used.

According to the invention, it is advantageous, after screwing, for the sleeve to be welded at at least one of its ends onto the outer shell of one of the sections, so as to prevent it unscrewing accidentally.

The welding at each end of the sleeve makes it possible to isolate the annular volume contained between the sleeve and the inner shells, and thus to prevent introduction into this volume of fluids outside the pipe which might cause corrosion.

In one variant of this second embodiment, the stop on which the threaded sleeve bears when it is screwed onto the other section is fitted with a spherical ring which makes it possible automatically to compensate for the defects in alignment between the axis of the sleeve and that of the stop.

According to the two embodiments described hereinabove for preventing the introduction of external fluids into the annular volume contained between the sleeve and the inner shells, this volume may be filled for example with a bituminous substance or a cellular material such as a polyurethane foam, which has the additional advantage of increasing the insulation of the pipe.

In a preferred implementation of the invention, the welding of the ends of the inner shell and of the outer shell of the same section is carried out after having imparted to the inner shell an extension with respect to the outer shell which corresponds substantially to that which exists when the inner shell is subjected, with respect to the outer shell, to a temperature difference which is approximately equal to half the temperature difference which will exist when the pipe is in use and which will cause heating of its inner shell.

According to an advantageous implementation of this characteristic, the inner shell is preheated to approximately half the temperature difference which is to exist between the inner shell and the outer shell when the pipe is used, and the ends of the two shells are then connected by welding them in this state.

The result of this is that, when a tube section according to the invention is at a homogeneous temperature, the inner shell is in a state of extension, whereas the outer shell is in a state of compression. This situation develops progressively when a hot fluid is made to flow-inside the pipe, the outer shell then being progressively compressed, whereas the inner shell enters progressively into traction [sic].

According to the invention, it is advantageous when the pipe is to be used for carrying a fluid at high temperature, to make the inner shells and possibly the collars from a metal which has a low coefficient of expansion, such as for example the one known under the designation Invar.

It is thus possible to use the pipe according to the invention for carrying steam at more than 100° C.

According to the invention, the inner and outer shells may have equal thicknesses, but it is in general advantageous for the inner shells of the sections which are to be welded together for making the pipe sections to have a thickness greater than that of the outer shells whose continuity is ensured by the sleeve.

Thus, the inner shell may for example have a thickness approximately 3 to 4 times greater than that of the outer shell.

According to a particular embodiment of the invention, the inner and outer shells are joined together by welding using collars whose thickness is substantially equal to the thickness of the thinnest shell.

In order to limit the magnitude of the thermal bridges which result from their presence, these collars extend over a length which preferably lies between 3 and 5 times the distance which separates the outer face of the inner shell from the inner face of the outer shell.

In one particular embodiment of the invention, the collars which join the two shells at their ends have a cross section in the general shape of an S or of a half sine wave.

In one variant, the collars have a cylindrical shape and their ends are welded onto annular bosses integral with the ends of the inner and outer shells which they join.

In another variant, the collars each have a cylindrical central part extended by two frustoconical parts welded directly to the outer tubular shell, and to the inner tubular shell.

According to the invention, the collars may advantageously be made from an alloy which has a low sensitivity to heat, such as that known under the name Invar.

According to preferred embodiment of the invention, the closed annular volume contained between the two steel shells is lined with a plurality of thin sheets of an anti-thermal radiation insulator, the said sheets being preferably separated by cavity structures which do not conduct heat, which prevent them being applied against each other. Such insulating sheets may for example consist of aluminium sheets with a thickness of a few hundredths of a millimeter.

According to another embodiment of the invention, the closed annular volume may be filled with an expanded synthetic material such as for example expanded polyurethane or polyethylene.

Considering the fact that tube sections which are usually available have lengths of approximately 12 meters, and that these tubes are subjected, especially when fitting the pipe, to strong bending forces, provision is made according to a preferred embodiment of the invention, to locate at appropriate intervals, for example every meter or every two meters, spacer members which are placed between the inner shell and the outer shell.

These spacer members must be made of a material which has sufficient mechanical strength but which is not a good conductor of heat, for example from a synthetic material.

In order to limit the thermal bridges constituted by the said spacer members, it is recommended according to the invention not to give them a constant cross section over the entire perimeter of their winding. These members may for example be in the form of blocks which are of sufficient size to prevent, during for example bending stresses, the inner shell from collapsing against the outer shell, the said blocks being joined together by thinner sections of material, which thus limits heat transfer.

According to the invention, it is advantageous, when the tube section is subjected to no abnormal stress, for the spacer members to come into contact with only one of the shells.

According to another preferred embodiment of the invention, the insulating character of the pipe is substantially improved by creating in the space contained between the inner shell and the outer shell a high vacuum which may for example be of the order of $10^{-5}$ to $10^{-8}$ bar.

This evacuation may be carried out by conventional techniques which generally involve prior degassing of the metal surfaces by cleaning or by heating.

In one variant, the annular volume contained between the inner shell and the outer shell may be filled with a gas which is a poorer conductor of heat than air, such as for example carbon tetrachloride or chloroform.

BRIEF DESCRIPTION OF THE DRAWINGS

With the aim of better explaining the invention, a description will now be given, by way of illustration and without any limiting nature, of several embodiments thereof represented on the attached drawing, in which:

FIG. 1 is a view in axial section of a first embodiment of the joint between two pipe sections according to the invention, FIG. 2 is a view in axial section of a second embodiment of the joint between two pipe sections according to the invention, FIG. 3 is a view of the part III in FIG. 2 on a larger scale, FIG. 4 is an enlarged sectional view of one variant of the bearing of the end of the sleeve in FIG. 2, FIG. 5 is a sectional view of one variant of the embodiment in FIG. 2, FIG. 6 is a sectional view representing a device which makes it possible to create the vacuum between the two shells of a section.

DETAILED DESCRIPTION OF THE INVENTION

Figure 7:
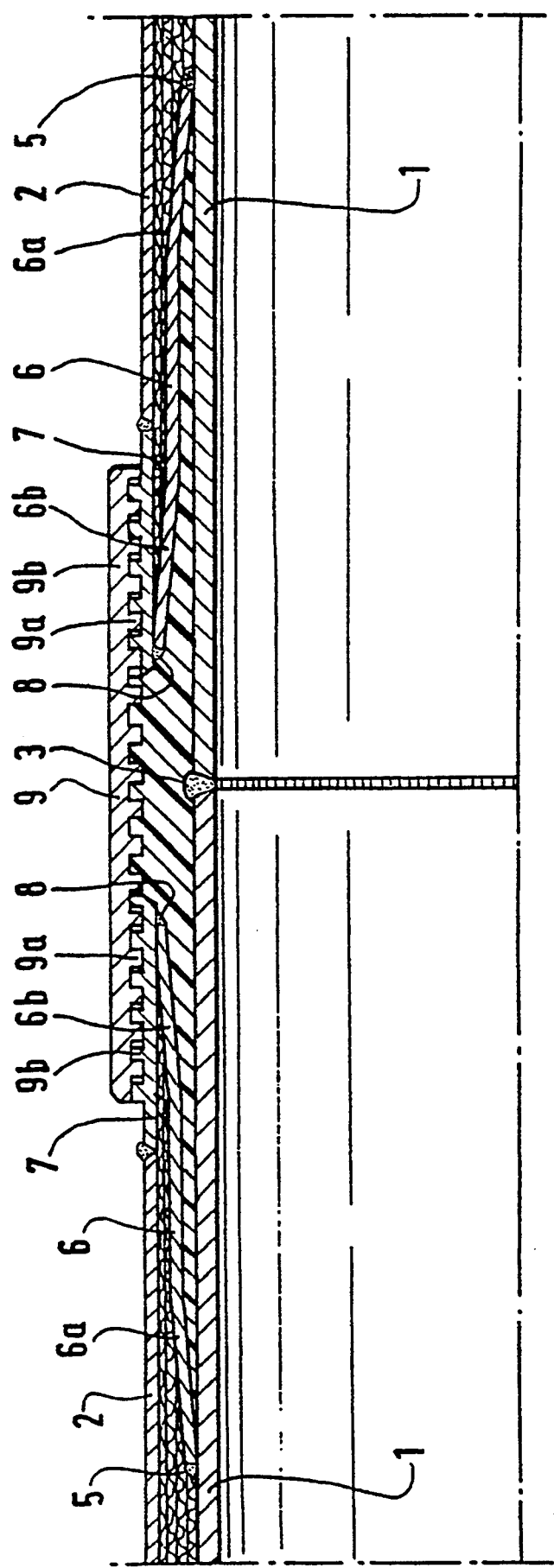
FIG. 7 is a view in longitudinal section of one variant embodiment of the joint in FIG. 1.

FIG. 1 shows the connection of the ends of the two pipe sections each comprising an inner tubular shell 1 and an outer tubular shell 2.

In this embodiment, near the end of each of the elements of one of the inner shells 1, an overthickness 4 is made by adding metal, the outer surface of which overthickness is then machined so as to make it cylindrically coaxial with the inner shell 1.

A cylindrical collar 6 is fixed at one of its ends by a weld bead 5 on the overthickness 4 while a shaped piece 7 attached by welding to the end of each of the outer shells 2 is connected onto the circular collar 6 by a weld bead 8.

The piece 7 has on its outer periphery a thread 9b whose turns have in the present case a rectangular cross section.

A cylindrical sleeve 9 comprises at each of its ends a female thread whose turns 9a also have a rectangular cross-sectional shape.

As can be seen in FIG. 1, there is a large clearance between the turns 9a and 9b, so that the sleeve 9, which has been engaged on one of the two pipe sections before joining the inner shells 1 by the weld 3, can be screwed at these two ends onto the turns 9b of the end elements 7 of the outer tubular shells 2.

This clearance between the turns 9a and 9b must be sufficient to compensate on the one hand for the alignment defects of the two inner shells 1 joined by the weld bead 3 (parallax defect between the axes of the two shells 1 and parallelism defect of these two axes) as well as for the difference in pitch which may exist between the turns 9b of one of the tube sections and the turns 9b of the other section.

According to this first embodiment of the invention, a material such as for example an epoxy resin or an araldite resin, is injected between the turns 9a and 9b, preferably a resin with rapid polymerization and which polymerizes without contraction and if possible with expansion.

The manner in which this material occupies the entire space contained between the turns 9a and 9b is represented as 10 in FIG. 1.

This filler material can be injected easily between the turns 9a and 9b from one or more orifices (not shown) made in the outer wall of the sleeve 9.

FIGS. 2 and 3 represent a second embodiment of the invention.

The inner 1 and outer 2 tubular shells are again seen in FIG. 2.

The inner shells 1 are extended by elements 4a provided with an overthickness 4 which are welded at 4b onto the inner shells 1.

As in the embodiment previously described, the ends of the inner 1 and outer 2 shells of each pipe section are joined together via collars 6 welded at 5 onto the overthickness 4 and at 8 onto the end 7 of the outer shell 2.

The two ends 7 of the outer shells 2 may either be attached by welding onto the tubes constituting the shells 2 or forged and machined at the ends of these tubes.

In order to produce the pipe represented in FIG. 1, steel is first added on in order to form an overthickness 4 near the ends of the tubes constituting the shells 1, then the outer surface of these overthicknesses is machined in order to make them concentric with the inner shell 1.

The ends 7 of the outer shells 2 are attached by welding onto the tubes constituting these shells 2, then one end of the collars 6 is welded at 8 onto the inner surface of the ends 7 of the outer shells 2.

The inner shell 1, possibly fitted with its insulating coating (not shown in FIG. 1) is then engaged inside the outer shell 2, fitted at each of its ends with a collar 6. Then, at one end of the tube section, the free end of the collar 3 is welded at 5 to the overthickness 4 of the inner shell 1.

According to one preferred embodiment of the invention, at the other end of the tube section, the welding 5 of the collar 6 onto the overthickness 4 of the inner shell 1 is performed while placing this inner shell 1 in a state of extension, whereas the outer shell 2 is placed in a state of compression.

By joining the inner and outer shells of the same pipe section by welding while the inner shell is stretched and the outer shell is compressed, a better distribution of the general stresses on the pipe when a hot fluid is made to flow inside the latter is obtained, which has the effect of causing extension of the inner shell 1.

When the various pipeline sections have been produced in this manner, after having engaged a sleeve 9 on the outer shell of each section, the various sections are butt joined by the weld beads 3 which thus ensure continuity of the inner shells 1.

It is then sufficient to move and screw the sleeve 9 onto the turns 9b of the two pipe sections and to inject the joining material between the turns 9a and 9b in order to obtain the pipe according to the invention.

According to the invention, in order to reduce the number of joints on the pipe, it is advantageous to produce sections by butt welding at least two 12 meter tubes to produce the tubular shells of each pipe section.

In this second embodiment of the invention, the sleeve 9 includes at one of its ends a female thread 9a which is engaged in a corresponding male thread 9b of the extension of the outer shell 2.

At its other end, the sleeve 9 bears against a shoulder 7a by its end which does not include any thread.

The part III in FIG. 2 has been represented on a larger scale in FIG. 3.

As can be seen in FIG. 3, the turns 9a and 9b have a bearing flank perpendicular to the axis of the pipe and there is moreover a relatively large clearance between the diameters of the turns 9a and 9b.

In this manner, it is possible, according to the invention, to compensate for errors of parallax which may result from the joining of the inner shells 1 by the weld 3.

FIG. 4 represents one variant of the stop of the right-hand end of the sleeve 9 in FIG. 2.

In this variant, there is located between the end of the sleeve 9 and the outer shell 2 a mobile ring 7b which has on its left a planar face against which the right-hand end of the sleeve 9 can slide and which has on its right a spherical surface which bears against a concave surface of the same shape which is produced on the piece 7.

In this manner, the defects in parallelism and in alignment of the axes of the two inner shells 1 of the two sections are compensated for.

In order to carry out the mounting of the pipe according to this second embodiment, it is sufficient to engage the thread 9a of the sleeve 9 onto the thread 9b of the outer shell of the pipe section which is situated on the left, in order that the right-hand end of the sleeve bears against the stop 7a, the sleeve 9 then being compressed by virtue of the turns 9a and 9b. The magnitude of this compression of the sleeve 9 is easily controlled by the angular rotation which is imparted to it with respect to the pipe.

According to the invention, the compression communicated to the sleeve 7 must be sufficient for the sleeve to remain compressed, whatever the stresses and in particular the bending stresses to which the pipe is subjected when it is fitted or when it is used.

The sleeve 9 is then immobilized by the welds 20 and 21.

FIG. 5 represents a third embodiment of the invention, in which the inner tubular elements 1 do not include a shaped piece but are joined directly by a weld bead 5.

In this embodiment, the outer tubular elements 2 are joined by weld beads 17 and 18, one to a shaped piece 16 fitted with an external thread 9b, the other to a shaped piece 15 acting as a stop.

The ends of the elements of the tubular shell 2 may also be forged and machined so as to take on a corresponding shape.

In this third embodiment of the invention, the collars 6 have an S-shaped cross-section, which allows them to be attached directly by a weld bead 5 to the outer surface of the inner shell 1 and by a weld bead 8 to the inner surface of the outer tubular shell 2.

According to a preferred implementation of the invention, the inner and outer elements are respectively set in tension and compressed before joining all the ends of the inner and outer shells.

In the embodiment shown in FIG. 5, the sleeve 9 is not welded onto the outer shells 1 and 2, but the space contained between the sleeve 9 and the inner shells 1 is filled with a substance 19 which may for example be a bituminous substance or alternatively a substance in the form of a foam which, in addition to the fact that it occupies the space situated below the sleeve 9 and thus prevents corrosion, supplements the thermal insulation.

In the embodiment shown in FIG. 5, a plurality of thin sheets 22 whose reflecting power constitutes efficient heat insulation has been placed between the tubular shells 1 and 2 of the various sections.

These thin sheets, which are for example, sheets of aluminium or sheets made of a synthetic material such as the one known under the trademark Kevlar, are advantageously separated from each other by a cavity structure 23 made from a material which is a poor conductor of heat.

Spacer members 24 are placed periodically between the inner and outer shells so as to maintain the distance between these two shells in spite of the stresses to which the pipe is subjected, in particular bending stresses.

These elements, members 24, are advantageously made of plastic and they have a shape such that they come into contact with the walls of the shells 1 and 2 only periodically, in order to limit the thermal conductivity.

FIG. 6 represents one embodiment in which a relatively strong vacuum is formed between the inner and outer shells of each section.

For this purpose, an orifice 25 connected to a tubing 26 is made for example in the overthickness of the piece 4a so as to make it possible to connect the space contained between the inner and outer shells with a vacuum pump.

When the desired vacuum is obtained, it is then sufficient to fill the tubing 26 in order to maintain the vacuum inside the volume in question.

In one variant, the volume between the inner and outer shells may be occupied by a gas which is a poor conductor of heat, such as for example carbon tetrachloride or chloroform.

FIG. 7 represents one variant embodiment of FIG. 1 in which the ends 7 of the outer tubular shells 2 each include male turns 9b on which the female turns 9a of the sleeve 9 engage with a sufficient clearance to compensate for the inaccuracies in pitch and the alignment defects resulting from the welding 3 of the inner tubular elements 1.

In this variant, the inner tubular shells 1 have, in line with the sleeve 9, a zone of sufficient length in which they are independent from the collars 6 and from the outer shells 2, so as to be able to undergo, in this zone, sufficient elastic bending for the male turns 9b of the ends 7 of the outer shells 2 to be able to bear on the female turns 9a of the sleeve 9, while compensating for the clearance existing between these turns so as to transmit the compression or traction forces between the sleeve and the ends of the outer tubular elements 2, in order to ensure continuity of the mechanical strength of the pipe at the joint.

According to the variant represented in FIG. 7, the collars 6, which have a central cylindrical part extended by two frustoconical surfaces 6a and 6b, are welded at one of their ends at 8 to the end of the tubular shells 2 and at their other end at a point 5 which is relatively distant from the weld 3 which joins the two inner tubular elements 1.

By way of example, the welds 5 of the two collars 6 onto the inner shells 1 may be approximately 1 meter apart.

Such an arrangement can also be used in the embodiment shown in FIG. 1, which has the advantage of ensuring security for the mechanical holding of the join in the event that the polymerizable substance which is injected between the sleeve 9 and the ends 7 of the outer shells 2 does not occupy the entire volume left free by the clearance between the turns, and thereby does not by itself ensure mechanical solidity of the whole. In this case, this substance would be partially crushed and the forces would be taken up as has just been described for FIG. 7.

Conversely, it is advantageous in the variant represented in FIG. 7 to inject a substance at the ends of the sleeve, through orifices (not shown), for example a polymerizable substance, which blocks the clearance between the turns, so as to prevent liquids, and in particular water, from being able to penetrate into the volume contained between the sleeve 9, the collars 6 and the ends of the inner shells 1, which volume is advantageously lined with a heat insulating substance.

It is clear that the embodiments which have been described hereinabove are in no way limiting, and that any desirable modifications can be made to them.

We claim:

1. A pipe for carrying fluids, particularly hydrocarbons, having steel tube sections, each comprising an outer tubular steel shell with at least one of said outer shells having thread thereon, and an inner cylindrical steel shell of smaller diameter, an outer surface of said inner shell being welded in a leaktight manner to said outer shell at each end of said tube sections, while leaving between the two shells a closed annular volume, wherein the ends of the inner shells of two successive tube sections are welded to one another at each joint between said tube sections, and a sleeve joining the ends of the outer shells is screwed onto said at least one of the outer shells by a cylindrical thread having at least one face perpendicular to an axis of said sleeve, which includes between respective male and female turns of said thread on said outer shell and said sleeve a sufficient clearance to compensate for misalignment of the two sections at said joint, and wherein such that when traction, compression or bending forces across said joint are exerted on the pipe, said sleeve communicates these forces to the outer shells while imparting to the pipe a mechanical strength at said joint which is at least equal to that of said tube sections.

2. A pipe according to claim 1, wherein said turns of said cylindrical thread have straight fronts and said clearance between respective male and female thread turns is filled with a substance, transmitting the compression or traction forces expected to be exerted between the sleeve and the outer shells.

3. A pipe according to claim 2, characterized in that collars are welded to the ends of the outer shells at points away from the ends of the inner shells.

4. A pipe according to claim 2, characterized in that the substance transmitting the forces is injected between the turns of the sleeve and those of the outer shells.

5. A pipe according to claim 2, wherein said substance between the turns is a resin that polymerizes without contraction or with expansion.

6. A pipe according to claim 2, wherein said substance between the is one of a polymerizable elastomer and a coal pitch which is applied hot.

7. A pipe according to claim 2, wherein said resin is an epoxy resin.

8. A pipe according to claim 1, wherein said sleeve is fitted at one of its ends with said internal thread part which is screwed onto said external thread part of a first tube section, and an opposite end of said sleeve is applied against a stop integral with the outer tubular shell of a second neighboring tube section with a sufficient force for the pipe to have, at the joints between the successive sections, a mechanical strength at least equal to that of the other parts of the pipe.

9. A pipe according to claim 8, wherein said internal thread part and said external thread part have respective bearing fronts that are substantially perpendicular to the axis of the pipe.

10. A pipe according to claim 8, wherein said opposite end of the sleeve presses on a ring which has a planar surface adjacent said sleeve, and said opposite end has a convex spherical surface which bears freely on a concave spherical surface made on the end of the outer shell.

11. A pipe according to claim 1, characterized in that an insulating material is placed in the volume delimited by the sleeve and the inner shells.

12. A pipe according to claim 1, wherein said inner shell and the outer shell of tube section are welded together at each end of said tube section, using a collar after the inner shell has been given an extension with respect to the outer shell which corresponds substantially to that which exists when the inner shell is subjected, with respect to the outer shell, to a temperature difference which will exist when the pipe is in use and which will cause heating of its inner shell.

13. A pipe according to claim 12, characterized in that, in order to assemble the inner shell and the outer shell of a tube section, the inner shell is preheated to approximately half the temperature difference which is to exist between the inner shell and the outer shell when the pipe is used.

14. A pipe according to claim 1, wherein said closed annular volume between the two shells of a pipe section comprise a plurality of thin sheets of an anti-thermal radiation insulator said sheets having a thickness of a few hundredths of a millimeter and being made of one of aluminum and Kevlar ®.

15. A pipe according to claim 14, wherein said sheets are separated by cavity structures which are poor conductors of heat.

16. A pipe according to claim 1, characterized in that spacer members made of a material which is a poor conductor of heat are periodically located in the closed volume contained between the inner shell and the outer shell.

17. A pipe according to claim 1, characterized in that a vacuum is created in the volume contained between the inner shell and the outer shell.

18. A pipe according to claim 1, wherein a gas which is a poor conductor of heat, is introduced into said closed annular volume between the inner shell and the outer shell.

19. A pipe according to claim 18 wherein said gas is one of carbon tetrachloride and chloroform.

20. A pipe according to claim 1, characterized in that the inner shell and the collars are made of a metal which has a low coefficient of expansion.

* * * * *